United States Patent [19]

Kurosawa et al.

[11] Patent Number: 4,533,721

[45] Date of Patent: Aug. 6, 1985

[54] CHLORINE CONTAINING POLYETHER SULFONE POLYMERS AND PREPARATION THEREOF

[75] Inventors: Shigeru Kurosawa, Oita; Takashi Ueshima, Sagamihara, both of Japan

[73] Assignee: Showa Denko Kabushiki Kaisha, Tokyo, Japan

[21] Appl. No.: 531,890

[22] PCT Filed: Dec. 23, 1981

[86] PCT No.: PCT/JP81/00406

§ 371 Date: Aug. 23, 1983

§ 102(e) Date: Aug. 23, 1983

[51] Int. Cl.$^3$ ............................................. C08G 81/06
[52] U.S. Cl. .................................... 528/174; 528/219
[58] Field of Search ................................ 528/174, 219

[56] References Cited

U.S. PATENT DOCUMENTS

| | | | |
|---|---|---|---|
| 3,481,885 | 12/1969 | Radlmann et al. | 528/174 |
| 3,532,670 | 10/1970 | Schnell et al. | 528/174 |
| 3,622,541 | 11/1971 | Darsow et al. | 528/174 |
| 3,634,354 | 1/1972 | Darsow et al. | 528/174 |
| 3,736,293 | 5/1973 | Novak et al. | 528/174 |
| 3,830,781 | 8/1974 | Leslie et al. | 528/174 |
| 4,105,636 | 8/1978 | Taylor et al. | 528/174 |
| 4,208,508 | 6/1980 | Hashino et al. | 528/174 |
| 4,307,222 | 12/1981 | Schwab et al. | 528/174 |
| 4,331,798 | 5/1982 | Staniland | 528/174 |

Primary Examiner—Lester L. Lee
Attorney, Agent, or Firm—Sughrue, Mion, Zinn, Macpeak, and Seas

[57] ABSTRACT

A novel, linear, chlorine-containing polyether-sulfone polymer excellent in flame retardancy, heat resistance, transparency, and water resistance, which is obtained by polymerizing at least one aromatic tri- or tetra-halide with at least one dialkali metal salt of a dihydric phenol, and a process for the preparation of this polymer. The polymer is represented by the following general formula:

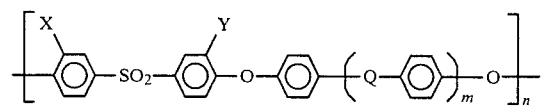

wherein X and Y stand for a hydrogen atom or a chlorine atom, with the proviso that at least one of X and Y is a chlorine atom, Q stands for a direct bond, —O—, —S— or a divalent aliphatic or alicyclic hydrocarbon group in which the carbon number is an integer of from 1 to 6, m is 0 or 1, and n is an integer of from 10 to 1000.

8 Claims, 2 Drawing Figures

Fig. 1

CHLORINE CONTAINING POLYETHER SULFONE POLYMERS AND PREPARATION THEREOF

DESCRIPTION

The present invention relates to a novel chlorine-containing polyether-sulfone polymer excellent in the flame retardancy, heat resistance, transparency, and water resistance, which is obtained by polymerizing at least one aromatic tri- or tetra-halide compound with at least one dihydric phenol dialkali metal salt, and also to a process for the preparation of this polymer.

A process for preparing a linear polyarylene-polyether-sulfone polymer by reacting a dihydric phenol dialkali metal salt with an activated dihalobenzenoid compound has been known (see Japanese Examined Patent Publication No. 42-7799). Furthermore, there has been proposed an improved process for the preparation of the above-mentioned polymer (see Japanese Examined Patent Publication No. 45-21318, No. 46-18146, and No. 46-21458).

Linear polyarylene-polyether polymers obtained according to these processes are excellent in various properties such as the heat resistance at high temperatures, the mechanical characteristics, and the alkali resistance, and they are widely used in various fields.

However, the flame retardancy of these polymers is not completely satisfactory as pointed out hereinafter. For example, when a film having a thickness of 0.1 mm is ignited, burning is continued even after the fire source has been removed.

It also is known that a polyarylene-ether-sulfone polymer containing a halogen atom on the aromatic nucleus can be obtained by reacting 4,4'-dichlorodiphenyl-sulfone with a dialkali metal salt of a nucleushalogenated bisphenol, as disclosed in the above-mentioned Japanese Examined Patent Publication No. 42-7799. However, in this process, since the bisphenol having a halogen atom at the ortho-position to the hydroxyl group of the bisphenol is used, the nucleophilic reactivity of the phenoxide is drastically reduced by the influence of the electron-attractive property of the halogen atom and the steric hindrance by the substitution at the ortho-position. Therefore, the process is disadvantageous in that a high temperature or a long time is necessary for completion of the reaction. Moreover, the obtained polymer is readily colored and is not advantageous as a polymeric material.

In "Polymer", volume 18, page 360 (1977), T. I. Atwood teaches that a chlorinated polyether-sulfone polymer can be obtained by melt-polymerizing a compound represented by the following structural formula:

at such a high temperature as 310° C. In a polymer obtained by the polymerization conducted at such a high temperature as described above, undesirable coloration or gelation is often caused. Moreover, since the melt polymerization technique is adopted, control of the viscosity is restricted. Namely, if it is intended to obtain a polymer having a high molecular weight, the viscosity of the reaction mixture should inevitably be increased, with the result that mechanical stirring becomes difficult and the temperature in the reaction mixture becomes uneven.

Furthermore, there is proposed a process in which 3,3',4,4'-tetrachlorodiphenylsulfone is polymerized with 4,4'-dihydroxydiphenylsulfone in the presence of anhydrous potassium fluoride at a temperature of 240° C. for 23 hours (see Japanese Unexamined Patent Publication No. 49-4800).

According to this process, a chlorinated polysulfone having a low reducing viscosity of about 0.34 may be obtained without formation of a gelation product. However, this process is not industrially advantageous, because a high reaction temperature and a long time are necessary, and is not advantageous from the economic viewpoint, because a fluoride which is more expensive than a hydroxide or carbonate should be used at least in a stoichiometric amount. Moreover, since fluoride is used, a reaction vessel composed of glass or metal cannot be used. Therefore, this process is still insufficient in various points.

Under this background, we made researches with a view to obtaining polymers while eliminating the foregoing defects. As the result, we found that when (A) at least one aromatic tri- or tetra-halide is reacted with (B) at least one dihydric phenol dialkali metal salt under heating in the presence of an inert, highly polar solvent, the foregoing defects are eliminated and an improved novel, substantially linear, chlorine-containing polyether-sulfone polymer represented by the following general formula (I) is obtained:

wherein X and Y stand for a hydrogen atom or a chlorine atom, with the proviso that at least one of X and Y is a chlorine atom, Q stands for a direct bond, —O—, —S— or a divalent aliphatic or alicyclic hydrocarbon group in which the carbon number is an integer of from 1 to 6, m is 0 or 1, and n is an integer of from 10 to 1000.

The novel, substantially linear polymer of the present invention has the following excellent characteristics (effects).

(1) The chlorine-containing polyether-sulfone polymer of the present invention contains unreacted chlorine atoms only in an amount of 7.4% to 13.9% by weight, but the flame retardancy of the polymer is very excellent and is ranked as "incombustible". For example, a film of the chlorine-containing polyether-sulfone polymer having a thickness of 0.1 mm is burnt on a flame but if the flame is removed, the fire is extinguished in a moment.

(2) The polymer of the present invention has a high heat distortion temperature and is excellent in thermal stability at high temperatures.

(3) In connection with the mechanical characteristics, the polymer of the present invention has a surprisingly high tensile strength (yield strength) which is comparable to the highest tensile strength among engineering resins now available and comes next to the tensile strength of reinforced plastics.

(4) Furthermore, the polymer of the present invention has a high hardness, and, therefore, the polymer can advantageously be used as a metal substitute.

(5) Moreover, the polymer of the present invention is excellent in transparency and has a good water resistance.

As is apparent from the foregoing description, the chlorine-containing polyether-sulfone polymer of the present invention has various excellent characteristics. Furthermore, the process for the preparation of this polymer according to the present invention has the following characteristics (effects).

(1) If 3,3',4-trichlorodiphenylsulfone (hereinafter referred to as "C3DPS") or 3,3',4,4'-tetrachlorodiphenylsulfone (hereinafter referred to as "C4DPS") is used as the aromatic tri- or tetra-halide (hereinafter referred to as "monomer (A)") and reacted with a dialkali metal salt of a dihydric phenol (hereinafter referred to as "monomer (B)") according to the process of the present invention, a polymer can be obtained without formation of a gelation product. In contrast, if C3DPS or C4DPS is gradually added to a solution of the above-mentioned dialkali metal salt to effect the reaction according to the process disclosed in "Journal of Polymer Science", Part A-1, volume 5, pages 2376 to 2378 (1967), a gelation product is formed with complete mixing of these monomers, and a valuable, substantially linear, chlorine-containing polyether-sulfone polymer cannot be obtained.

(2) When the monomer (A) is reacted with the dialkali metal salt of the monomer (B) in the present invention, if the molar ratio between these two monomers is changed, the difference over the reaction of 4,4'-dichlorodiphenylsulfone (hereinafter referred to as "C2DPS") with a dialkali metal salt of a dihydric phenol, disclosed in the above reference, becomes prominent.

In order to obtain a preferred polymer, in each process, the molar ratio between the halide component and the dihydric phenol dialkali metal salt is 1:1. When C2DPS is used as the halide component, if the above molar ratio is slightly increased or reduced, the molecular weight (the degree of polymerization) is reduced. In contrast, when C3DPS or C4DPS is used according to the present invention, if the molar ratio of C3DPS or C4DPS to the dihydric phenol dialkali metal salt is slightly increased above 1:1, the molecular weight is reduced, but if this molar ratio is slightly reduced below 1:1, the molecular weight is increased. In view of the foregoing, it is apparent that the monomer (A) used in the present invention is greatly different from C2DPS in the reaction mode.

As pointed out hereinbefore, the polymer of the present invention has excellent characteristics. Moreover, although the monomer (A) used in the process of the present invention is a trifunctional compound or tetrafunctional compound, we found reaction conditions where the monomer (A) can act substantially as a bifunctional compound. We have now completed the present invention based on this finding.

The polymer of the present invention can be obtained by reacting the monomer (A) with a dialkali metal salt of the monomer (B) under heating in the presence of an inert, highly polar solvent.

(A) Monomer (A)

The monomer (A) that is used in the present invention is represented by the following general formula (III):

wherein X and Y stand for a hydrogen atom or a chlorine atom, with the proviso that at least one of X and Y is a chlorine atom.

As specific examples of the monomer (A), there can be mentioned 3,3',4-trichlorodiphenylsulfone (that is, C3DPS) and 3,3',4,4'-tetrachlorodiphenylsulfone (that is, C4DPS). These compounds can easily be prepared by using as the starting material at least one member selected from chlorobenzene and o-dichlorobenzene.

(B) Dialkali Metal Salt of Monomer (B)

The dialkali metal salt of the monomer (B) that is used in the present invention is a dialkali metal salt of a monomer (B) represented by the following general formula (II):

wherein Q stands for a direct bond, —O—, —S— or a divalent aliphatic alicyclic hydrocarbon group in which the carbon number is an integer of from 1 to 6, and m is 0 or 1.

In the general formula (II), m is preferably 1, and Q is preferably a direct bond, an oxygen atom, a sulfur atom, a divalent aliphatic hydrocarbon group in which the carbon number is up to 3, or a divalent alicyclic group in which the carbon number is 5 or 6.

As typical instances of the monomer (B), there can be mentioned 2,2-bis(4-hydroxyphenyl)propane, 1, 1-bis(4-hydroxyphenyl)methane, 1,2-bis(4-hydroxyphenyl)ethane, 1,1-bis(4-hydroxyphenyl)cyclohexane, 4,4'-dihydroxydiphenyl ether, 4,4'-dihydroxydiphenyl, and 4,4'-dihydroxydiphenyl sulfide. Among these monomers (B), 2,2-bis(4-hydroxyphenyl)propane is especially preferred from the viewpoints of cost and reactivity.

The dialkali metal salt of the monomer (B) is prepared from the monomer (B) and an alkali metal compound, described hereinafter, separately from the polymerization, or in the polymerization system before the polymerization or simultaneously with the polymerization. Accordingly, by the term "dihydric phenol dialkali metal salt", it is indicated that the monomer (B) component is in effect reacted in the form of a dialkali metal salt. For example, when an alkali metal carbonate is used as the alkali metal compound, it sometimes happens that the monomer (B) and alkali metal carbonate first form a monoalkali metal salt of the dihydric phenol, the monoalkali metal salt reacts with the monomer (A) before formation of the dialkali metal salt, and, then, the remaining phenol forms the alkali metal salt and the polymerization is performed. Thus, it sometimes happens that the formation of the salt and the polymerization cannot clearly be distinguished from each other. In this case, it can be said that the dihydric phenol acts in effect as the dialkali metal salt, though the details are not apparent even to us. This case is also included in the scope of the present invention.

As the alkali metal of the alkali metal compound, there can be mentioned lithium, sodium, and potassium. In view of reactivity and cost, sodium and potassium are preferred. As the alkali metal compound, there can be mentioned hydroxides, carbonates, and hydrogencarbonates. Hydroxides and carbonates are especially preferred. Namely, sodium hydroxide, potassium hydroxide, sodium carbonate, and potassium carbonate are preferably used as the alkali metal compound.

(C) Inert, Highly Polar Solvent

The inert, highly polar solvent that is used in the present invention is a solvent for the monomer (A), the monomer (B), and the formed polymer and dissolves limited amounts of the dialkali metal salt of the monomer (B) and the alkali metal carbonate or hydrogencarbonate under polymerization temperature conditions. If the solvent dissolves these alkali metal salts, the polymerization reaction can be advanced smoothly. The fact that the solvent dissolves a limited amount of the alkali metal carbonate means that formation of the dialkali metal salt of the monomer (B) from the monomer (B) and the alkali metal carbonate or hydrogencarbonate is advantageously performed. Especially in the present invention, using the monomer (A) containing chlorine atoms differing in reactivity, undesirable side reactions are controlled and a soluble polymer is advantageously obtained.

For the foregoing reasons, in the present invention, a sulfoxide compound and a sulfone compound are preferably used as the inert, highly polar solvent. As preferred examples of the sulfoxide or sulfone compounds, there can be mentioned compounds represented by the following general formula (IV):

(IV)

wherein R and R', which may be the same or different, stand for a monovalent aliphatic hydrocarbon or aromatic hydrocarbon group having no aliphatic unsaturated linkage of the alpha-carbon atom and having preferably up to 8 carbon atoms, or R and R' are bonded together to form a divalent alkylene group, and x is 1 or 2.

As R and R' in the general formula (IV), there can be mentioned lower alkyl groups such as methyl, ethyl, propyl, n-butyl, and isobutyl groups; aryl groups such as a phenyl group; and a divalent alkylene bridge as in thiophene oxide or dioxide.

As preferred examples of the inert, highly polar solvent to be used in the present invention, there can be mentioned dimethylsulfoxide, diethylsulfoxide, dimethylsulfone, diethylsulfone, tetramethylenesulfone, and diphenylsulfone. Dimethylsulfoxide, dimethylsulfone, and tetramethylenesulfone are especially preferred.

(D) Polymerization Methods

The polymer of the present invention can be prepared according to any of the three polymerization methods described below.

According to the first polymerization method, the dialkali metal salt of the monomer (B) is reacted with the monomer (A) in the inert, highly polar solvent. This method involves (a) an embodiment in which an anhydrous dihydric phenol dialkali metal salt prepared in advance in a different reaction system is used and reacted with the monomer (A) in the inert, highly polar solvent, (b) an embodiment in which the monomer (B) is first reacted with an alkali metal hydroxide in the presence of the inert, highly polar solvent, water present in the reaction system is removed by azeotropic distillation with an inert azeotropic solvent to produce a substantially anhydrous state, and the monomer (A) is then added to effect the reaction, and (c) an embodiment in which a hydrated particulate dialkali metal salt of the monomer (B) is heated in the inert, highly polar solvent and an inert azeotropic solvent to remove water by azeotropic distillation and the monomer (A) is then added to effect the reaction.

According to the second polymerization method, a substantially equimolar mixture of a hydrated particulate dialkali metal salt of the monomer (B) and the monomer (A) is heated in the presence of the inert, highly polar solvent and an inert azeotropic solvent to remove water of hydration by azeotropic distillation to produce a substantially anhydrous state and the main polymerization reaction is carried out during or after the above azeotropic distillation.

According to the third polymerization method, a mixture of the monomer (A), the monomer (B), and the alkali metal carbonate or hydrogencarbonate is heated with the inert, high polar solvent and inert azeotropic solvent to form the dialkali metal salt of the monomer (B), formed water is removed by azeotropic distillation, and the main polymerization reaction is carried out during or after the azeotropic distillation.

In each of the foregoing methods, it is necessary that the polymerization reaction be carried out in the substantially anhydrous state. In many cases, water is present in the polymerization system. For example, water provided by the use of an aqueous solution of an alkali metal hydroxide, water formed on production of the salt, and water present in the solvent are present in the polymerization system. Such water should be removed from the polymerization system before the polymerization or during the advance of the polymerization, but it is preferred that water be removed prior to occurrence of the main polymerization reaction. As means for removing water, there is preferably adopted azeotropic distillation using an inert azeotropic solvent capable of forming an azeotropic mixture with water.

The inert azeotropic solvent should be a solvent incapable of reacting with the monomer (A), the monomer (B), and the dialkali metal salt of the monomer (B). As the inert azeotropic solvent, there are preferably used aromatic hydrocarbons such as benzene, toluene, xylene, chlorobenzene, and o-dichlorobenzene and nucleus-halogenated aromatic hydrocarbons (having 1 or 2 halogen atoms).

The amount used of the inert azeotropic solvent differs to some extent according to the polymerization method adopted, but ordinarily, the inert azeotropic solvent is used in an amount of up to 15 parts by weight, preferably 0.5 to 10 parts by weight, per part by weight of the inert, highly polar solvent. The inert azeotropic solvent may be used in a larger amount, but in this case, the polymerization becomes disadvantageous because a reaction vessel having a large capacity should be used, the productivity is reduced, and a long time is required for removing the excessive portion of the inert azeotropic solvent. On the other hand, if the amount of the inert azeotropic solvent is too small, removal of water by the azeotropic distillation becomes difficult, and the reaction mixture becomes a homogeneous solution and an undesirable side reaction sometimes takes place between water and the monomer (A).

The respective polymerization methods will now be described in detail.

When the polymerization is carried out according to the first polymerization method, after the reaction system is rendered substantially anhydrous, the dialkali metal salt of the monomer (B) is mixed and contacted with the monomer (A). Gradual addition of the monomer to a solution of the dialkali metal salt of the monomer (B) at a high temperature should be avoided because a gelation product is formed. The difference between the known process using a bifunctional halide and the process of the present invention using the monomer (A) resides in this point.

When the monomer (A) is gradually added to a solution of the dialkali metal salt of the monomer (B), a gelation product is formed. The reason is considered to be as follows.

In case of, for example, C4DPS, the chlorine atom at the para-position to the $SO_2$ group has a high reactivity (activity), but the reactivity of the chlorine atom at the meta-position is low. However, if the concentration of the monomer (A) is considerably lower than the concentration of the dialkali metal salt of the monomer (B), namely if the concentration of the chlorine atom at the para-position to the $SO_2$ group is considerably lower than the concentration of the phenoxide, the chlorine atom at the meta-position to the $SO_2$ group participates in the reaction with the phenoxide, resulting in formation of branches. Accordingly, it is considered that when the monomer (A) is gradually added, gelation is caused in the foregoing manner.

Therefore, when the polymerization is carried out according to the first polymerization method, attention should be paid to the mixing and contacting manner.

According to one embodiment, a solution of the dialkali metal salt of the monomer (B) is cooled below 120° C. The monomer (A) is added at one time to this solution. In the inert, highly polar solvent, the dialkali metal salt of the monomer (B) is precipitated under cooling, and the amount dissolved of the dialkali metal salt of the monomer (B) is limited. Moreover, the reaction speed is reduced by cooling and the reaction with the chlorine atom at the meta-position is controlled. The cooling temperature is below 120° C., preferably below 100° C. The monomer (A) should be added while maintaining this temperature.

According to another embodiment, the monomer (A) is added at one time to a heterogeneous dispersion of the dialkali metal salt of the monomer (B) in a liquid mixture of the inert azeotropic solvent and the inert, highly polar solvent. According to this embodiment, since the dialkali metal salt of the monomer (B) is not substantially dissolved, it is possible to cause the reaction simultaneously with the mixing. It has been found that by adoption of this mixing method, occurrence of the gelation in the solution can be avoided. The excessive amount of the inert azeotropic solvent is removed by azeotropic distillation, and the polymerization reaction is carried out in the state where the liquid phase is concentrated to such an extent that the dialkali metal salt of the monomer (B) has a solubility in the liquid phase. In this embodiment, the temperature at the time of addition of the monomer (A) is preferably lower than 140° C. and especially preferably lower than 120° C. The weight ratio of the inert azeotropic solvent to the inert, highly polar solvent at the time of addition of the monomer (A) is preferably in the range of from 0.5/1 to 10/1 and especially preferably in the range of from 0.5/1 to 2/1.

In the case where the polymer of the present invention is prepared according to the second method, it is preferred that the weight ratio of the inert azeotropic solvent to the inert, highly polar solvent be in the range of from 1/1 to 10/1, especially in the range of 2/1 to 5/1. When this method is adopted, water of hydration in the dialkali metal salt of the monomer (B) is removed from the reaction system by azeotropic distillation with the inert azeotropic solvent before occurrence of the main polymerization reaction to produce a substantially anhydrous state. It is preferred that the inert azeotropic solvent be then removed by distillation to such an extent that the dialkali metal salt of the monomer (B) has a substantial solubility in the solution, and the polymerization reaction be then caused to advance.

It was found that when the polymer is prepared according to this method, the ratio of the inert azeotropic solvent to the inert, highly polar solvent is important. Namely, if the weight ratio of the inert azeotropic solvent to the inert, highly polar solvent is lower than ½, sufficient removal of water in the reaction system becomes difficult. In an extreme case, the reaction system becomes substantially homogeneous. Accordingly, an undesirable side reaction takes place between water and the monomer (A) in the reaction system to form a phenol. Formation of the phenol results in breakage of the stoichiometric ratio between the monomers (A) and (B) and the adjustment of the degree of polymerization becomes impossible.

This method is advantageous in that since the dialkali metal salt is finely divided, it is finely dispersed in the polymerization solution. Accordingly, dehydration can easily be accomplished, and the polymerization is accomplished after the dehydration. Furthermore, since all the monomers and the solvents are charged at the start, incorporation of undesirable oxygen (air) in the reaction system during the polymerization is prevented, and, therefore, a polymer having a beautiful color is obtained.

In the case where the polymer of the present invention is prepared according to the third polymerization method, the monomer (A) is reacted with the monomer (B) in the presence of an alkali metal carbonate or bicarbonate in a liquid mixture of the inert azeotropic solvent and the inert, highly polar solvent.

According to this method, the alkali metal carbonate or bicarbonate is reacted with the monomer (B) to form a phenoxide. This phenoxide is reacted with the monomer (A) to effect the polymerization. However, it is not clear whether the dialkali metal salt of the monomer (B) is formed by the reaction of the monomer (B) with the alkali metal carbonate or bicarbonate before occurrence of the polymerization or formation of the phenoxide is conducted simultaneously with the polymerization reaction.

In carrying out the polymerization according to this method, the ratio of the inert azeotropic solvent to the inert, highly polar solvent at the time of initiation of the polymerization is ordinarily such that the amount of the inert azeotropic solvent is 0.5 to 5 parts by weight, preferably 0.5 to 3 parts by weight, per part by weight of the inert, highly polar solvent. If the amount of the inert azeotropic solvent is smaller than 0.5 part by weight per part by weight of the inert, highly polar solvent, removal of formed water becomes difficult and no good results are obtained.

(E) Polymerization Conditions and Post Treatment (1) Usage (Reaction) Ratios

The amount of the monomer (A) used in preparing the polymer of the present invention is 98 to 105 moles, preferably 100 to 102 moles, per 100 moles of the dialkali metal salt of the monomer (B). If the amount of the monomer (A) is too small and below this range, undesirable branching is caused in the formed polymer, and even if a gelation product is not formed, the molecular weight is extremely increased and the physical properties of the polymer are degraded.

When an alkali metal carbonate or bicarbonate is used as in the case where the polymer is prepared according to the third polymerization method, it is preferred that the monomer (A) be used in an amount of 98 to 105 moles, especially 100 to 102 moles, per 100 moles of the monomer (B). The amount used of the alkali metal carbonate or bicarbonate is determined based on the amount of the monomer (B).

In the case where the alkali metal carbonate is used, it is preferred that the amount used of the alkali metal salt be 1 to 2 moles, especially 1.05 to 1.2 moles, per mole of the monomer (B).

In the case where the alkali metal hydrogencarbonate is used, it is preferred that the amount used of the alkali metal hydrogencarbonate be 2 to 4 moles, especially 2.1 to 2.5 moles, per mole of the monomer (B).

As is apparent from the foregoing description, use of the alkali metal carbonate or hydrogencarbonate in a slightly excessive amount is allowed, though this is not allowed in case of an alkali metal hydroxide.

(2) Usage Ratio of Inert, Highly Polar Solvent

The amount used of the inert, highly polar solvent is ordinarily 20 to 1000 parts by weight per 100 parts by weight of the polymer to be formed, but in view of the easiness in stirring of the polymer solution, the post treatment after the polymerization, or the recovery of the formed polymer, it is preferred that the inert, highly polar solvent be used in an amount of 50 to 300 parts by weight per 100 parts by weight of the polymer to be formed.

(3) Polymerization Temperature

The polymerization temperature to be adopted for the preparation of the polymer of the present invention differs according to the kind of the inert, highly polar solvent used, but the polymerization temperature is ordinarily 120° C. to 250° C. and it is preferred that the polymerization be carried out at a temperature of 130° C. to 200° C., especially 140° C. to 180° C. In the case where the polymerization temperature is too high, if a sulfoxide compound such as dimethylsulfoxide is used as the inert, highly polar solvent, the formed polymer is often colored by the decomposition of the solvent. Accordingly, the polymerization should be carried out at a temperature lower than the decomposition temperature of the solvent, and if a sulfoxide compound is used as the inert, highly polar solvent, it is preferred that the polymerization temperature be lower than 160° C. On the other hand, if the polymerization is carried out at too low a temperature, the reaction speed is low and a long time is required for completion of the polymerization, and therefore, the process becomes disadvantageous from an economic viewpoint. Furthermore, if the polymerization temperature is too low, a polymer having a high molecular weight can hardly be obtained.

(4) Atmosphere

If oxygen (air) is present in the reaction system, coloration of the formed polymer is caused, and formation of a polymer having a high molecular weight is often inhibited. Accordingly, it is necessary that the atmosphere of the reaction system be sufficiently replaced with an inert gas (nitrogen is preferred from an economic viewpoint) before initiation of the polymerization and the polymerization be carried out in an inert gas atmosphere.

(5) Dehydration

If water is separated from the azeotropic mixture of the inert azeotropic solvent and water and only the inert azeotropic solvent is recycled to the reaction system, the amount of water in the reaction system can be reduced to the saturation amount of water in the inert azeotropic solvent. Further dehydration can be accomplished by performing the azeotropic distillation of the inert azeotropic solvent and water while not recycling the separated inert azeotropic solvent to the reaction system.

(6) Stopping of Polymerization

If the reaction system is cooled, the polymerization is substantially stopped because of solidification. Furthermore, the polymerization can be stopped by dilution with a solvent for the formed polymer, or by adding a non-solvent to the reaction mixture to precipitate the formed polymer. Moreover, an alkyl halide such as methyl chloride or tert-butyl chloride or an active halide compound such as 4,4'-dichlorodiphenysulfone is added to the obtained solution containing the formed polymer after completion of the polymerization and is reacted with the terminal phenoxide of the polymer to cap the polymer ends, whereby the polymerization is stopped.

(7) Separation and Purification of Polymer

Known methods customarily adopted for separation and purification of ordinary polymers may be adopted for separating and purifying the obtained polymer after completion of the polymerization. For example, a solvent for the polymer, which is a non-solvent for the formed salt, such as chlorobenzene, is added to the polymer solution to dilute the polymer solution, and the precipitated salt is separated by filtration. Then, a non-solvent for the polymer, such as methyl alcohol, is added to the polymer solution, whereby the polymer can be separated. The purification is accomplished by repeating the above operation. Then, the polymer is heated under reduced pressure to distill off the solvent left in the polymer, whereby the purified polymer can be obtained.

(F) Properties and Uses of Polymer

The so-purified polymer of the present invention is in the form of foamed fibers having a white to light yellow color (a molded article of the polymer has a light yellow to light brown color). Most of polymers obtained according to the present invention are soluble in organic solvents such as chlorobenzene, methylene chloride, chloroform, tetrachloroethane, and dimethylformamide. The polymer of the present invention is represented by the above-mentioned formula (I). When the polymer is used as a molding material, the polymerization degree (n) is preferably 20 to 200, though the preferred polymerization degree differs to some extent according to the structure of the recurring units.

In the case where the molecular weight of the polymer of the present invention is low (that is, the polymerization degree is low), the mechanical strength is not sufficient if it is used as a molding material, but when it is mixed with other resin, it can act as a flame retardant imparting a flame retardancy to the resin. When a lowmolecular-weight compound is used as a flame retardant, a problem of bleeding or migration often arises, and especially if the low-molecular-weight compound is used in a large amount, the mechanical properties of the resin are often drastically reduced. This problem, however, can be solved by using a polymer (inclusive of a polycondensate) having a relatively high molecular weight. If a certain polymer of the present invention having a low polymerization degree is incorporated in a commercially available polymer (for example, a polysulfone resin), an excellent flame retardancy can be given to the polymer without degradation of the transparency or heat distortion temperature of the polymer and without substantial changes of other mechanical properties. The polymer that is used for this purpose is not limited to a polymer having a relatively low polymerization degree (a polymer having a relatively high polymerization degree may be used as a flame retardant), but a surprisingly high additive effect can be exerted even by a polymer having a relatively low polymerization degree.

As pointed out hereinbefore, a polymer of the present invention having a relatively high molecular weight has a very good flame retardancy, and most of polymers of the present invention having a relatively high molecular weight are excellent in the transparency and water resistance. They also have a high heat distortion temperature and are excellent in thermal stability at high temperatures. Moreover, they are excellent in various mechanical properties, the tensile strength and hardness being especially high.

The polymer of the present invention can be molded according to known molding methods customarily adopted for other resins of this type. Additives used for ordinary synthetic resins, such as processability improving agents, fillers (glass fibers, inorganic materials, and carbon fibers), antistatic agents, and colorants may be incorporated into the polymer of the present invention.

The polymer of the present invention or a composition formed by incorporating additives therein may be formed into various molded articles differing in shape according to molding methods customarily adopted for ordinary synthetic resins, such as the extrusion molding method, the injection molding method, and the compression molding method. The molding temperature differs according to the polymerization degree of the polymer and other factors. If the polymerization degree is relatively high, the molding temperature is ordinarily 300° C. to 350° C.

The polymer of the present invention is substantially linear and is soluble in solvents. Accordingly, even a polymer having a high polymerization degree, which is inferior in the melt moldability, can easily be molded into a film according to the casting method using a solvent.

Since the polymer of the present invention has excellent properties as described above, it can be used in various fields. For example, the polymer is effectively used not only as a flame retardant but also for the production of films, sheets, and various molded articles. Especially, the polymer of the present invention can widely be used as a hot water pipe, a steam sterilization vessel, a housing and parts in the electrical and electronic fields, an interior part of an automobile or airplane, a sliding part, a gear, an insulating material, and the like.

(G) Examples, Comparative Examples, and Application Examples

The present invention will now be described in detail with reference to the following examples and application examples.

Incidentally, in the examples, the polymerization degree was determined based on the number average molecular weight Mn calculated from the molecular weight measured by the osmometry or light scattering method and the molecular weight distribution (Mw/Mn) determined by gel permeation chromatography (the measurement method will be described hereinafter).

In the application examples, the yield strength and elongation were measured according to the method of ASTM D-638-58T, and the Izod impact strength (notched) was measured according to the method of ASTM D-256-56. The Vicat softening temperature was measured according to the method of ASTM D-1525, and the Rockwell hardness (M scale and R scale) was measured according to the method of ASTM D-785. In the examples, comparative examples, and application examples, the heat distortion temperature was measured according to the method of ASTM D-648.

In the application examples, the inherent viscosity was calculated from the following formula with respect to a solution containing 0.5 g/100 ml of the polymer in dimethylformamide at a temperature of 20° C.:

$$\eta\text{inh (inherent viscosity)} = \frac{\ln(t/t_0)}{C}$$

wherein t stands for the flow-out time (seconds) of the polymer solution, $t_0$ stands for the flow-out time (seconds) of the solvent, and C stands for the concentration of the polymer solution (grams of the polymer in 100 ml of the solution).

EXAMPLE 1

(A) Preparation of Alkali Metal Salt of Monomer (B)

A 500 ml capacity flask equipped with a stirrer, a thermometer, a water-cooling condenser-equipped continuous water trap, a dropping funnel, and a nitrogen-introducing tube was charged with 18.26 g (0.08 mole) of 2,2-bis(4-hydroxyphenyl) propane as the monomer (B), 200 ml (221 g) of chlorobenzene as the inert azeotropic solvent, and 60 ml (66 g) of dimethylsulfoxide as the inert, highly polar solvent. Nitrogen gas was bubbled in the content at room temperature (20° C.) to 60° C. to sufficiently replace the atmosphere of the reaction system with nitrogen. Then, 20.32 g (0.16 mole) of an aqueous solution of sodium hydroxide as the alkali metal compound (the sodium hydroxide concentration was 31.50% by weight) was dropped through the dropping funnel and 5 ml of water was passed through the dropping funnel to wash away the solution of sodium hydroxide from the dropping funnel into the flask. The mixture was sufficiently stirred, and the liquid temperature was elevated with stirring and water was removed by azeotropic distillation with chlorobenzene while distilled chlorobenzene was returned to the reaction system. A white precipitate was formed in the reaction mixture. Recycle of chlorobenzene was stopped, and chlorobenzene was removed by distillation from the reaction mixture until 60 ml of chlorobenzene was left in the flask. Water in the reaction system was substantially completely removed.

(B) Preparation of Polymer

The reaction system was cooled to 80° C., and 28.48 g (0.08 mole) of 3,3',4,4'-tetrachlorodiphenylsulfone (C4DPS) as the monomer (A) was added at one time. The temperature of the reaction system was gradually elevated to distill off chlorobenzene in the reaction system, and polymerization was carried out at a temperature of 150° C. to 155° C. for 2 hours with stirring. Then, at a temperature of 150° C., methyl chloride was bubbled into the polycondensation solution over a period of 30 minutes to cap the polymer ends. The reaction system was naturally cooled to about 60° C., and 300 ml of chlorobenzene was added and the precipitated salt was separated by filtration using a glass filter. Then, about 500 ml of methyl alcohol was added to precipitate the formed polymer. The polymer was dissolved by using about 400 ml of methylene chloride as a good solvent for the polymer, and about 600 ml of methyl alcohol (non-solvent) was added to the solution to precipitate the polymer. The polymer was separated by filtration and washed. This operation was conducted once more to purify the obtained polymer. Then, the methylene chloride solution of the polymer was poured into methyl alcohol to finally recover a polymer in the form of foamed fibers. The polymer was dried at a temperature of 130° C. under reduced pressure to obtain 38.8 g (94.8% of the theoretical value) of a white polymer (hereinafter referred to as "polycondensate (a)"). The polymerization degree (n) was 58.

(C) Properties of Polymer

When the elementary analysis of the polycondensate (a) was performed, the following results were obtained.

Calculated:
C=63.41% by weight, H=3.44% by weight, Cl=13.86% by weight.
Found:
C=63.34% by weight, H=3.89% by weight, Cl=13.80% by weight.

From the foregoing results and analysis results described below, it was confirmed that the recurring units of the polycondensate (a) were represented by the following structural formula:

A solution of the polycondensate (a) in chloroform was subjected to gel permeation chromatography using a column (Showdex A80-M (Trademark) supplied by Showa Denko). A single peak was observed. Namely, any possibility of the presence of an ultra-high-molecular-weight polymer suggesting a branched structure was not found.

The polycondensate (a) was soluble in methylene chloride, chloroform, 1,1,2,2-tetrachloroethane, chlorobenzene, and o-dichlorobenzene but was swollen in acetone. However, the polycondensate (a) was not changed in n-hexane and methyl alcohol (not dissolved or swollen).

EXAMPLE 2

A solution of the disodium salt of the monomer (B) in the liquid mixture of dimethylsulfoxide and chlorobenzene, which was prepared in the same manner as described in (A) of Example 1 (the concentration was adjusted by conducting the hydration treatment in the same manner as described in (A) of Example 1), was cooled to 110° C. A solution (liquid temperature of 80° C.) formed by dissolving 25.73 g (0.08 mole) of 3,3',4-trichlorodiphenylsulfone (C3DPS), instead of 3,3',4,4'-tetrachlorodiphenylsulfone (C4DPS) used as the monomer (A) in (B) of Example 1, in 30 ml of chlorobenzene was added at one time to the cooled solution. Just after addition of the above solution, the liquid reaction mixture was colored a light yellow. The temperature of the liquid reaction mixture was gradually elevated and chlorobenzene was distilled off until 5 ml of chlorobenzene was left in the liquid reaction mixture. The reaction was carried out at a temperature of 145° C. to 155° C. for 1 hour to obtain an apparently homogeneous solution having a high viscosity. Then, 20 ml of anhydrous chlorobenzene was added to the solution, and the liquid temperature was maintained at 130° C. and methyl chloride was blown into the liquid for 30 minutes to stop the polymerization. Then, the obtained polymer was purified and dried in the same manner as described in (B) of Example 1 to obtain 36.7 g (96.2% of the theoretical value) of a polymer (hereinafter referred to as "polycondensate (b)") in the form of white foamed fibers. The polymerization degree (n) was 78.

When the polycondensate (b) was subjected to the elementary analysis, the following results were obtained.

Calculated:
C=67.99% by weight, H=4.44% by weight, Cl=7.43% by weight.
Found:
C=67.87% by weight, H=4.35% by weight, Cl=7.51% by weight.

From the foregoing results and analysis results described below, it was confirmed that the recurring units of the polycondensate (b) were represented by the following structural formula:

When the polycondensate (b) was subjected to gel permeation chromatography as in case of the polycondensate (a), no possibility of the presence of an ultra-high-molecular-weight polymer suggesting a branched structure was found.

The solubility characteristics of the polycondensate (b) were similar to those of the polycondensate (a). The polycondensate (b) was soluble in methylene chloride, chloroform, 1,1,2,2-tetrachlorroethane, chlorobenzene, and o-dichlorobenzene and swollen in acetone. The polycondensate (b) was not dissolved or swollen in n-hexane, methyl alcohol, and ethyl alcohol.

The polycondensate (a) obtained in Example 1 and the polycondensate (b) obtained in Example 2 were subjected to infrared absorption spectrum analysis. The results are shown in FIGS. 1 and 2, respectively.

Figure 1:
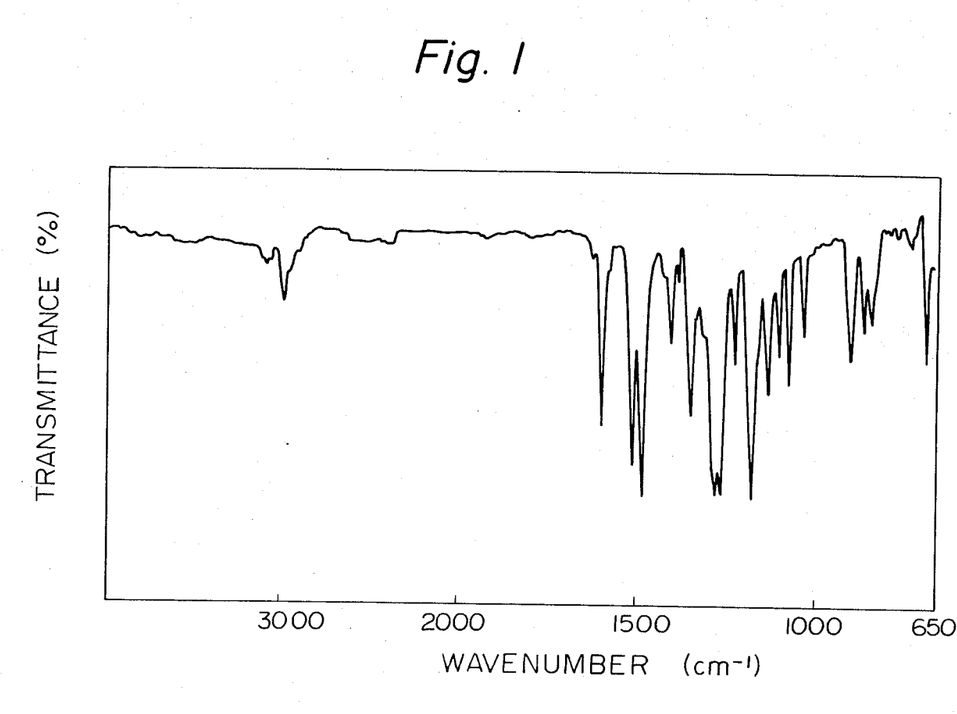
FIG. 1 shows the infrared absorption spectrum of the polycondensate (a) obtained in Example 1 and FIG. 2 shows the infrared absorption spectrum of the polycondensate (b) obtained in Example 2.
Figure 2:
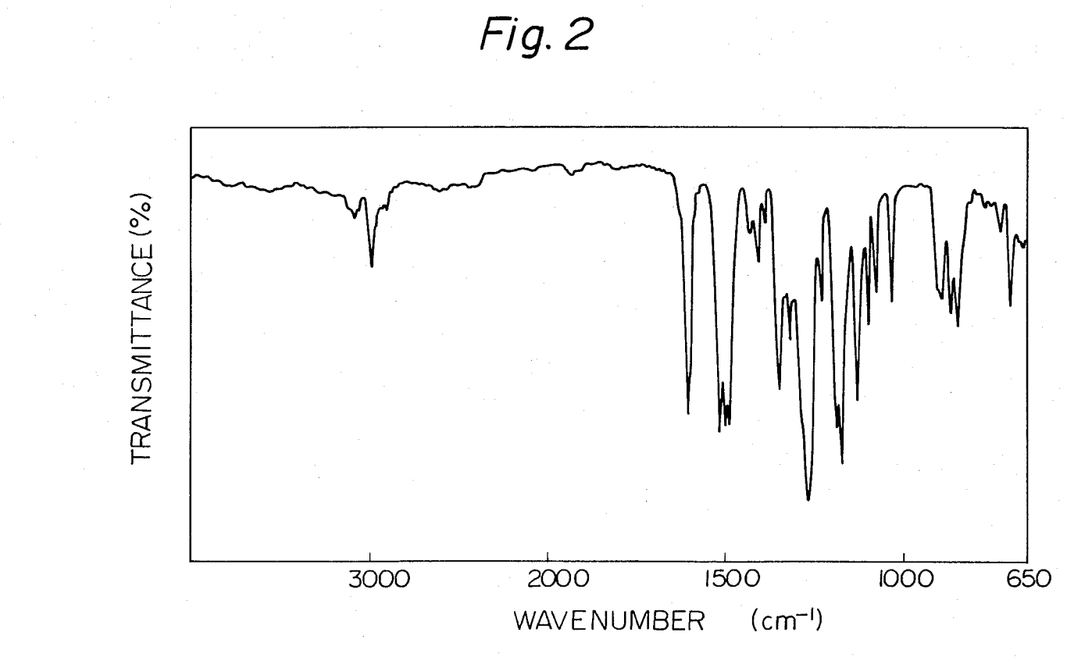

From FIGS. 1 and 2, it is seen that in each of the polycondensate obtained in Example 1 and the polycondensate (b) obtained in Example 2, there are present absorptions attributed to —SO$_2$— at 1340 cm$^{-1}$ and 1280 to 1260 cm$^{-1}$ and an absorption attributed to the aromatic ether linkage at 1280 to 1260 cm$^{-1}$. Furthermore, in case of the polycondensate (a), two sharp absorptions are observed at about 1500 cm$^{-1}$, which suggests the presence of two kinds of benzene nuclei. In case of the polycondensate (b), three sharp absorptions are observed at about 1500 cm$^{-1}$, which suggests the presence of three kinds of benzene nuclei. In each of the polycondensates (a) and (b), absorption of the benzene nucleus attributed to the following structure (A) is observed at 1510 cm$^{-1}$. In the polycondensate (a), one strong and sharp absorption of the benzene nucleus attributed to the following structure (B) is shifted to a lower wave number, that is, 1480 cm$^{-1}$, by the influence of chlorine (Cl). In the polycondensate (b), not only an absorption at 1480 cm$^{-1}$ but also an absorption of the benzene nucleus attributed to the following structure (C), which is not observed in the polycondensate (a), is observed:

Structure (A)

Structure (B)

Structure (C)

The polycondensate (a) obtained in Example 1 and the polycondensate (b) obtained in Example 2 were subjected to the nuclear magnetic resonance absorption spectrum at a temperature of 35° C. in deuterated chloroform as the solvent at a concentration of 1% by using a nuclear magnetic resonance apparatus (supplied by Hitachi, Ltd.) of 60 MHz.

It is supposed that the recurring units of the polycondensate (a) have the above-mentioned structure formula; namely, it is considered that the structure is as follows:

It is necessary and sufficient if the manner of substitution of 3,3',4,4'-tetrachlorodiphenylsulfone (monomer (A)) in the polycondensate (a) is confirmed. Accordingly, the presence of three protons Ha, Hb, and Hc will now be quantitatively proved.

Ha was observed as a doublet at a δ value of 7.98 ppm. Namely, this is split in two small lines by the coupling with Hb.

Hb was observed as a quadrilet as a δ value of 7.69 ppm. Namely, this is greatly split in two doublets by the coupling with Hc, and these doublets are split in two small lines, respectively, by coupling with Ha.

Hc was observed as a doublet at a δ value of 7.25 ppm. This boublet is due to coupling with Hb.

As is seen from the foregoing, only signals corresponding to Ha and Hb are observed in the range of δ values of from 8.0 to 7.5. This means that the chlorine atom at the para-position to the SO$_2$ group is selectively reacted. If both the chlorine atoms at the para-position and meta-position to the SO$_2$ group are reacted concurrently, protons of the benzene nuclei on both the sides of the SO$_2$ group are not simply divided into three kinds.

Furthermore, a signal of the proton of the CH$_3$ group was observed at a δ value of 1.70 ppm. If it is supposed that the area of this signal corresponds to six protons, each of the signal areas of the protons Ha and Hb corresponds to 2.0 protons within an error.

In connection with other protons Hc, Hd, and He, signals of deuterated chloroform used as the solvent appeared at a δ value of 7.23 ppm, and, therefore, the quantitative determination was not performed.

By the foregoing results, it was proved that the recurring units of the polycondensate (a) are represented by the above structural formula.

As in the case of the polycondensate (a), it is supposed that the recurring units of the polycondensate (b) have the above-mentioned structural formula; namely, it is considered that the structure is as follows:

It is necessary and sufficient if the manner of substitution of 3,3',4-trichlorodiphenylsulfone (monomer (A)) in the polycondensate (b) is confirmed. Accordingly, the presence of five protons Ha, Hb, Hc, Hd, and He will now be quantitatively proved.

Ha was observed as a doublet at a δ value of 7.98 ppm, and this corresponded to the proton Ha of the polycondensate (a).

Hb was observed as a quadrilet at a δ value of 7.69 ppm, and this corresponded to the proton Hb of the polycondensate (a).

Hd was observed as an apparent doublet at a δ value of 7.83 ppm. Namely, the doublet due to coupling with He was observed. If the resolving power is increased, coupling of two Hd protons with each other will also be observed, though the signal is small.

Furthermore, Hc was observed as a doublet at a δ value of 7.25 ppm, and He was observed as a doublet at a δ value of 7.23 ppm.

When the numbers of the respective protons are counted based on the proton of the CH$_3$ group observed at a δ value of 1.70 ppm, the sum of one proton Ha and the protons Hb and Hd having the signals overlapped thereto corresponds to three protons within an error.

By the foregoing results, it was proved that the recurring units of the polycondensate (b) are represented by the above structural formula.

From the above-mentioned results of the infrared absorption spectrum analysis, nuclear magnetic resonance absorption analysis, elementary analysis, and gel permeation chromatography, it is apparent that the recurring units of the polycondensate (a) obtained in Example 1 and the recurring units of the polycondensate (b) obtained in Example 2 are represented by the above-mentioned structural formulae, respectively.

Application Example

A polymer corresponding to the polycondensate (a) was prepared by carrying out polymerization in a scale 20 times the scale of Example 1 (the molar ratio and polymerization conditions were the same as in Example 1). Furthermore, a polymer corresponding to the polycondensate (b) was prepared by carrying out polymerization in a scale 20 times the scale of Example 2 (the molar ratio and polymerization conditions were the same as in Example 2). These polycondensates (a) and (b) were purified and dried in the same manner as described in (B) of Example 1. For comparison, a polymer (hereinafter referred to as "polycondensate (c)") having an inherent viscosity of 0.36 and having recurring units represented by the following formula:

was prepared. The properties of these three polymers were examined.

More specifically, the polycondensates (a), (b), and (c) were hot-pressed (compression-molded) under compression of 100 kg/cm² for 10 minutes by using a hot press maintained at 330° C. Each of the obtained pressed plates was transparent and had a light yellow color. The physical properties of the pressed plates were measured. The obtained results are shown in Table 1.

TABLE 1

| Item | Polycondensate (a) | Polycondensate (b) | Polycondensate (c) |
| --- | --- | --- | --- |
| Yield strength (kg/cm³) | 850 | 775 | 692 |
| Elongation (%) | 60 | 50 | 120 |
| Izod impact strength (notched) (kg · cm/cm) | 3.0 to 3.8 | 4.0 to 4.3 | 6.2 |
| Heat distortion temperature (under load of 18.6 kg/cm²) (°C.) | 177 | 175 | 174 |
| Vicat softening point (°C.) | 192 | 191 | 189 |
| Rockwell hardness | M-95, R-127 | M-85, R-126 | M-85, R-121 |

From the results shown in Table 1, it is seen that the polymer of the present invention has a much higher yield strength than that of the comparative polycondensate (c) having no chlorine substituent on the nucleus and the polymer of the present invention has a higher hardness.

When the pressed plate of the polycondensate (a) was held in air maintained at 350° C. for 1 hour, no particular change of the color was observed. When this fact is taken into consideration in the light of data shown in Table 1, it is understood that the polymer of the present invention is excellent in heat stability at a high temperatures even though it has chlorine atoms on the nucleus.

The combustibilities of the polycondensate (a) of the present invention and the comparative polycondensate (c) were tested according to UL Standard. It was found that the combustibility of the polycondensate (a) was 94V-O, while the combustibility of the polycondensate (c) was 94V-1.

EXAMPLE 3

An alkali metal salt of the monomer (B) was prepared under the same conditions as described in (A) of Example 1, except that 22.38 g (0.16 mole) of an aqueous solution of potassium hydroxide (the concentration of potassium hydroxide was 40.12% by weight) was used as the aqueous solution of the alkali metal compound instead of the aqueous solution of sodium hydroxide used in (A) of Example 1. Water was completely removed from the reaction system containing this alkali metal salt by azeotropic distillation with chlorobenzene, and polymerization was carried out in the same manner as described in (B) of Example 1 (the polymerization temperature was 155° C. and the polymerization time was 45 minutes). In the same manner as described in (B) of Example 1, polymerization was stopped and the obtained polymer was purified and dried to obtain 39.6 g (96.8% of the theoretical value) of a polymer in the form of a white foamed fiber. The polymerization degree of this polymer was 130.

EXAMPLE 4

A 500 ml-capacity flask equipped with a stirrer, a thermometer, a water-cooling condenser-equipped continuous water trap, and a nitrogen-introducing tube was charged with 19.02 g (0.05 mole) of a disodium salt hexahydrate of 2,2-bis(4-hydroxyphenyl)propane as the alkali metal salt of the monomer (B), 17.80 g (0.05 mole) of 3,3',4,4'-tetrachlorodiphenylsulfone as the monomer (A), 40 ml of dimethylsulfoxide as the inert, highly polar solvent, and 160 ml of chlorobenzene as the inert azeotropic solvent. A liquid-accumulating portion of the continuous water trap was filled with 40 ml of chlorobenzene. At a temperature of 60° C., the mixture was stirred for 20 minutes while bubbling nitrogen in the reaction system. The temperature in the reaction system was gradually elevated, and the liquid was refluxed at 120° C. to 135° C. to trap water continuously. When about 4.7 ml of water was distilled off, reflux of chlorobenzene was stopped, and chlorobenzene and water were distilled off from the reaction system. With this distillation, the temperature of the reaction mixture gradually rose and arrived at 155° C. over a period of 1.5 hours. At this temperature, the polymerization was conducted for 3 hours. The liquid reaction mixture became viscous. To this viscous liquid was added 0.72 g (0.0025 mole; 5 mole % based on the monomer (A)) of 4,4'-dichlorophenylsulfone. At the above temperature, the reaction was conducted for 1 hour. Then, the liquid reaction mixture was naturally cooled and diluted with 250 ml of chlorobenzene to precipitate the formed salt, and the obtained polymer was purified and dried in the same manner as described in (B) of Example 1 to obtain 24.8 g (97.0% of the theoretical value) of a white polymer. The polymerization degree of the polymer was 44.

EXAMPLE 5

A flask similar to the flask used in Example 4 was charged with 22.83 g (0.1 mole) of 2,2-bis(4-hydroxyphenyl) propane as the monomer (B), 35.605 g (0.1 mole) of 3,3',4,4'-tetrachlorodiphenylsulfone as the monomer (A), 14.66 g of anhydrous potassium carbonate (purity of 99%) as the alkali metal compound, 95 ml of dimethylsulfoxide as the inert, highly polar solvent, and 100 ml of chlorobenzene as the inert azeotropic solvent. Bubbling of nitrogen was initiated at room temperature (20° C.), and the temperature of the reaction system was gradually elevated. Formed water was removed by azeotropic distillation with chlorobenzene. When the total amount of the distillate was increased to 70 ml, no substantial distillation of water was observed. While distillation of chlorobenzene was further continued, the temperature of the reaction system was elevated to 160° C. The reaction was carried out at this temperature for 2.5 hours, whereby the solution was made viscous. Then, the polymerization was stopped by capping the ends of the formed polymer in the same manner as described in (B) of Example 1. Then, separation of the formed salt and purification and drying of the obtained polymer were performed in the same manner as described in (B) of Example 1 to obtain 49.3 g (96.4% of the theoretical value) of a polymer in the form of a white foamed fiber. The polymerization degree of the polymer was 190.

EXAMPLE 6

A dialkali metal salt of the monomer (B) was prepared in the same manner as described in (A) of Example 1 except that 60 ml of tetramethylenesulfone was used as the inert, highly polar solvent instead of dimethylsulfoxide used in (A) of Example 1, and 200 ml of toluene was used as the inert azeotropic solvent instead of chlorobenzene used in (A) of Example 1. Then, water in the reaction mixture was continuously removed by azeotropic distillation with toluene to collect about 21 ml of water in the water trap. At this point, the dialkali metal salt was dispersed in the form of a white slurry in the mixture of the solvents. A minute amount of water was distilled off from the reaction system together with toluene, and about 160 ml of toluene as a whole was distilled off.

The reaction system was cooled to 100° C., and 3,3′,4,4′-tetrachlorodiphenylsulfone in the same amount as used in (B) of Example 1 was added at one time. The temperature of the reaction system was elevated while excessive toluene was distilled off. The reaction was carried out at 210° C. for 1 hour and at 220° C. for 1 hour, whereby the slurry-like reaction solution was converted to a homogeneous viscous liquid. The reaction liquid was cooled to 160° C. and 1.15 g (0.004 mole) of 4,4′-dichlorodiphenylsulfone was added. At this temperature, the terminal-capping reaction was carried out for 1 hour. After the polymerization, the obtained polymer was purified and dried in the same manner as described in (B) of Example 1 to obtain 38.4 g (93.9% of the theoretical value) of a polymer in the form of a light-yellow foamed fiber. The polymerization degree of the polymer was 40.

EXAMPLE 7

An alkali metal salt of the monomer (B) was prepared and dehydrated in the same manner as in Example 5 except that 11.78 g (0.11 mole) of anhydrous sodium carbonate having a purity of 99% was used as the alkali metal compound instead of anhydrous potassium carbonate used in Example 5. A polymer was prepared under the same conditions as in Example 5, except that the polymerization was carried out for 8 hours at a temperature of 180° C. Then, the ends of the obtained polymer were capped and the polymer was purified and dried in the same manner as described in Example 5 to obtain 48.8 g (95.5% of the theoretical value) of a polymer in the form of a light-yellow foamed fiber. The polymerization degree of the polymer was 132.

EXAMPLE 8

An alkali metal salt of the monomer (B) was prepared under the same conditions as described in (A) of Example 1, except that 16.02 g (0.08 mole) of 1,1-bis(4-hydroxyphenyl) methane was used as the monomer (B) instead of 2,2-bis(4-hydroxyphenyl) propane used in (A) of Example 1. A polymer was prepared in the same manner as described in (B) of Example 1, except that this alkali metal salt was used and the polymerization was conducted at 145° C. to 155° C. for 4 hours. Then, the terminal ends of the obtained polymer were capped and the polymer was purified and dried in the same manner as described in (B) of Example 1 to obtain 36.74 g (95.0% of the theoretical value) of a polymer in the form of a white fiber. The polymerization degree of the polymer was 77, and the glass transition point was 183° C. In the same manner as described in (C) of Example 1, it was confirmed that the recurring units of the polymer had the following structural formula:

The polymer was compression-molded under a compression of 100 kg/cm² at 300° C. for 10 minutes, and a film having a thickness of 0.2 mm was obtained.

EXAMPLE 9

The polymerization was carried out under the same conditions as described in Example 3 except that 21.47 g (0.08 mole) of 1,1-bis(4-hydroxyphenyl)cyclohexane was used as the monomer (B) instead of 2,2-bis(4-hydroxyphenyl)propane used in Example 3. The terminals of the obtained polymer were capped, and the polymer was purified and dried in the same manner as described in Example 3 to obtain 42.8 g (97.0% of the teoretical value) of a polymer in the form of a white fiber. The polymerization degree of the polymer was 89. A light-yellow transparent film having a thickness of 0.2 mm was prepared by compression-molding the obtained polymer under compression of 100 kg/cm² at 320° C. for 10 minutes. The glass transition temperature of the polymer was 204° C.

In the same manner as described in (C) of Example 1, it was confirmed that the polymer had recurring units represented by the following structural formula:

EXAMPLE 10

A flask similar to the flask used in (A) of Example 1 (400 ml of chlorobenzene was filled in the water trap for continuously trapping water) was charged with 100 ml of dimethylsulfoxide as the inert, highly polar solvent and 200 ml of chlorobenzene as the inert azeotropic solvent, and nitrogen was bubbled in the charge of the flask for 15 minutes. Then, 11.0 g (0.10 mole) of hydroquinone was added as the monomer (B) and the temperature was elevated to 80° C. while bubbling nitrogen. At this temperature, 22.35 g (0.20 mole) of an aqueous solution of potassium hydroxide (the concentration of potassium hydroxide was 50.20% by weight) was dropped into the reaction liquid with stirring over a period of 5 minutes. The dropping funnel was washed with 5 ml of water, and the washing liquid was added to the reaction liquid (all of the foregoing operations were conducted in a nitrogen gas atmosphere). The temperature of the reaction system was elevated, and water was continuously removed by azeotropic distillation with chlorobenzene. When the amount distilled of water was about 19 ml, the continuous reflux was stopped and the distillate was removed from the reaction system. When the total amount of distilled chlorobenzene was 140 ml, the reaction system was cooled to 80° C., and a solution of 32.16 g (0.10 mole) of 3,3',4-trichlorodiphenylsulfone is 40 ml of chlorobenzene was added at one time. The temperature of the reaction system was elevated, and 130 ml of chlorobenzene was distilled off. Then, the polymerization was carried out at 155° C. and 4 hours to obtain a viscous liquid. The terminals of the obtained polymer were capped in the same manner as described in (B) of Example 1. The reaction liquid was poured into water, the polymer was pulverized, and the formed salt and the inert, highly polar solvent were extracted by using heated water then extracted by using heated acetone. Then, the residue was dried under reduced pressure at a temperature of 150° C. to obtain 35.7 g (99.5% of the theoretical value) of a light-brown flaky polymer. The polymerization degree of the obtained polymer was 80. A film having a thickness of 0.2 mm was prepared by compression-molding the polymer at 350° C. under compression of 100 kg/cm² for 10 minutes. The glass transition point of the polymer was 206° C. In the same manner as described in (C) of Example 1, it was confirmed that the recurring units of the polymer had the following structural formula:

EXAMPLE 11

The polymerization was carried out under the same conditions as in Example 10, except that 20.2 g (0.10 mole) of 4,4'-dihydroxydiphenyl ether was used as the monomer (B) instead of hydroquinone used in Example 10. In the same manner as described in Example 10, the terminals of the obtained polymer were capped and the polymer ws purified and dried. As the result, 43.8 g (97.1% of the theoretical value) of a light-yellow fibrous polymer was obtained. The polymerization degree of the polymer was 74, and the glass transition point was 177° C. In the same manner as described in (C) of Example 1, it was confirmed that the recurring units of the polymer had the following structural formula:

Comparative Example 1

In the same manner as described in (A) of Example 1, a solution of a disodium salt of 2,2-bis(4-hydroxyphenyl)propane in a liquid mixture (mixed solvent) of dimethylsulfoxide and chlorobenzene was prepared. The solution was dehydrated in the same manner as in (A) of Example 1, and substantially all of chlorobenzene was distilled off. Then, the liquid temperature was elevated to 155° C.

Then, a solution of 28.48 g (0.08 mole) of 3,3', 4,4'-tetrachlorodiphenylsulfone in 30 ml of chlorobenzene was dropped into the resulting apparently transparent solution over a period of 20 minutes in a nitrogen gas atmosphere. During the dropwise addition, the reaction temperature was maintained above 150° C. and chlorobenzene was distilled off from the reaction system. After completion of the dropwise addition, the reaction mixture was stirred at 155° C. for 5 minutes, and the viscosity of the polymerization mixture was abruptly increased and stirring became impossible. The reaction product was naturally cooled, and 300 ml of chlorobenzene was added to the reaction product. The product was not dissolved, but became swollen in an agar-like state. The product was also insoluble in dimethylformamide.

From the foregoing results, it is understood that if the monomer (A) used in the present invention is gradually added to a solution of a dialkali metal salt of the monomer (B) at a relatively high temperature, a valuable, substantially linear polymer as obtained according to the present invention cannot be formed at all.

Comparative Example 2

A solution of a disodium salt of 2,2-bis(4-hydroxyphenyl)propane in a liquid mixture (mixed solvent) of dimethylsulfoxide and chlorobenzene was prepared in the same manner as described in (A) of Example 1. In the same manner as described in (A) of Example 1, the solution was dehydrated. Distillation was carried out until 60 ml of chlorobenzene was left in the liquid mixture.

The liquid reaction mixture was cooled to 80° C., and 27.06 g (0.076 mole) of 3,3',4,4'-tetrachlorodiphenylsulfone (95 mole % based on the disodium salt of 2,2-bis(4-hydroxyphenyl)propane) was added at a time to the liquid reaction mixture. The temperature of the reaction mixture was elevated and excessive chlorobenzene was distilled off at 135° C. to 155° C. The reaction was carried out at 155° C. After a lapse of 40 minutes, the formed polymer clung and adhered to the stirrer, and stirring became impossible. The polymer was not dissolved in chloroform, chloroform, and dimethylformamide but only swollen therein.

From the foregoing results, it is apparent that when a small amount (95 mole %) of the monomer (A) is used for the dialkali metal salt of the monomer (B) and the polymerization is carried out, a valuable, substantially linear polymer as obtained according to the present invention cannot be obtained at all.

Incidentally, in the accompanying drawings.

We claim:
1. A substantially linear, chlorine-containing polyether-sulfone polymer consisting essentially of repeating units represented by the following general formula (I):

wherein X and Y stand for a hydrogen atom or a chlorine atom, with the proviso that at least one of X and Y is a chlorine atom, Q stands for a direct bond, —O—, —S— or a divalent aliphatic or alicyclic hydrocarbon group in which the carbon number is an integer of from 1 to 6, m is 0 or 1, and n is an integer of from 10 to 1000.

2. A substantially linear, chlorine-containing polyether-sulfone polymer as set forth in claim 1, wherein one of X and Y is a hydrogen atom and the other is a chlorine atom.

3. A substantially linear, chlorine-containing polyether-sulfone polymer as set forth in claim 1, wherein each of X and Y is a chlorine atom.

4. A substantially linear, chlorine-containing polyether-sulfone polymer as set forth in claim 1, wherein X is a chlorine atom and Y is a hydrogen or chlorine atom, they are distributed statistically along the main chain, and the number l of the chlorine atom per recurring unit of the formula (I) is in the range of $1 < l < 2$.

5. A substantially linear, chlorine-containing polyether-sulfone polymer as set forth in any of claims 1, 2, 3 or 4, wherein Q is and m is 1.

6. A process for the preparation of a chlorine-containing polyether-sulfone polymer, which comprises adding at least one aromatic tri- or tetra-halide represented by the following general formula (III):

wherein X and Y stand for a hydrogen atom or a chlorine atom, with the proviso that at least one of X and Y is a chlorine atom,
at a time to a substantially anhydrous mixture of at least one dialkali metal salt of a dihydric phenol represented by the following general formula (II):

wherein Q stands for a direct bond, —O—, —S— or a divalent aliphatic or alicyclic hydrocarbon group in which the carbon number is an integer of from 1 to 6, and m is 0 or 1,
and an inert, highly polar solvent at a temperature of 0° C. to 140° C. in an amount of 98 to 105 moles per 100 moles of said dialkali metal salt, and heating the mixture to effect reaction.

7. A process for the preparation of a chlorine-containing polyether-sulfone polymer, which comprises contacting and reacting 1 mole of a dihydric phenol represented by the following general formula (II):

wherein Q stands for a direct bond, —O—, —S— or a divalent aliphatic or alicyclic hydrocarbon group in which the carbon number is an integer of from 1 to 6, and m is 0 or 1,
with 2 moles of an alkali metal hydroxide in the presence of an inert, highly polar solvent and an inert solvent capable of azeotropic distillation with water to form a dialkali metal salt of said dihydric phenol, removing water in the resulting liquid mixture by azeotropic distillation with said inert azeotropic solvent to render the mixture substantially anhydrous and render said dialkali metal salt substantially insoluble in the liquid mixture, adding an aromatic halide represented by the following general formula (III):

wherein X an Y stand for a hydrogen atom or a chlorine atom, with the proviso that at least one of X and Y is a chlorine atom,
to the liquid mixture, and carrying out polymerization while distilling off the inert azeotropic solvent by heating.

8. A process for the preparation of a chlorine-containing polyether-sulfone polymer, which comprises heating 100 moles of a dihydric phenol represented by the following general formula (II):

wherein Q stands for a direct bond, —O—, —S— or a divalent aliphatic or alicyclic hydrocarbon group in which the carbon number is an integer of from 1 to 6, and m is 0 or 1,
98 to 105 moles of an aromatic tri- or tetra-halide represented by the following general formula (III):

wherein X and Y stand for a hydrogen atom or a chlorine atom, with the proviso that at least one of X and Y is a chlorine atom,
and 100 to 200 moles of an alkali metal carbonate or 200 to 400 moles of an alkali metal hydrogencarbonate in the presence of an inert, highly polar solvent and an inert azeotropic solvent to substantially form a dialkali metal salt of said dihydric phenol and effecting polymerization while distilling off formed water by azeotropic distillation with the inert azeotropic solvent or after said distillation.

* * * * *